April 29, 1947.   F. H. BEALL   2,419,810
MOTOR VEHICLE CONTROL APPARATUS
Filed July 29, 1939   4 Sheets-Sheet 1

INVENTOR.
Frank H. Beall

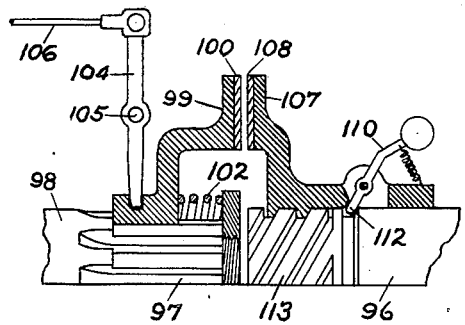
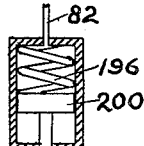
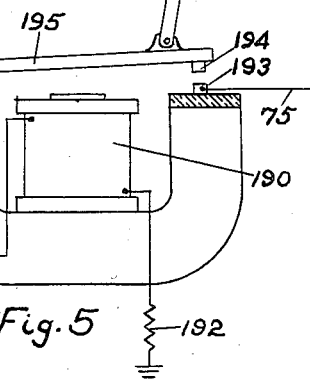
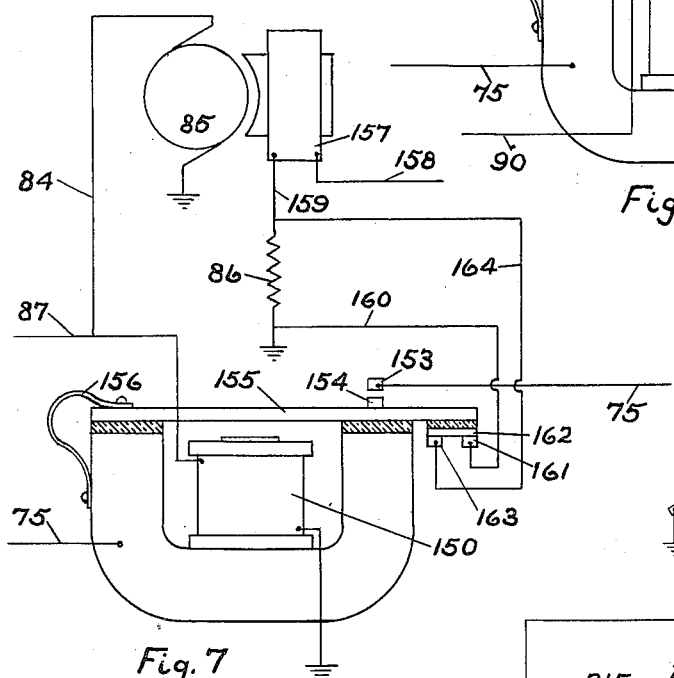
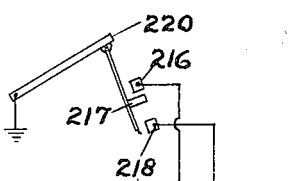
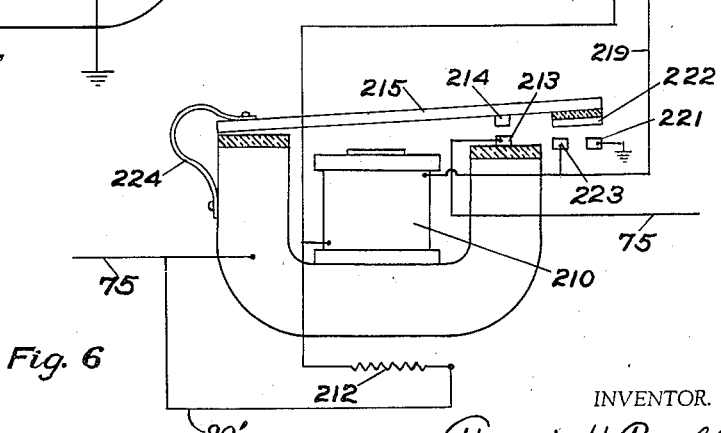

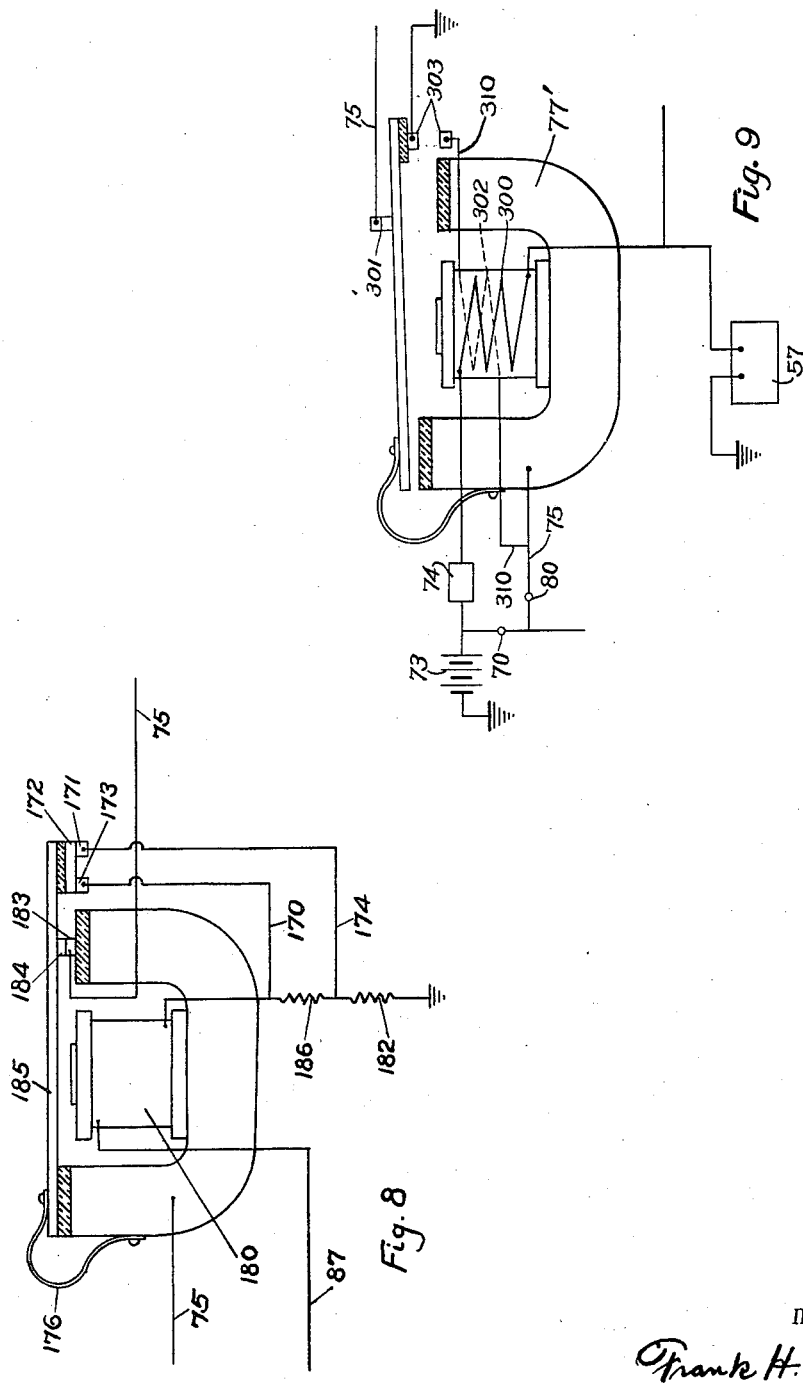

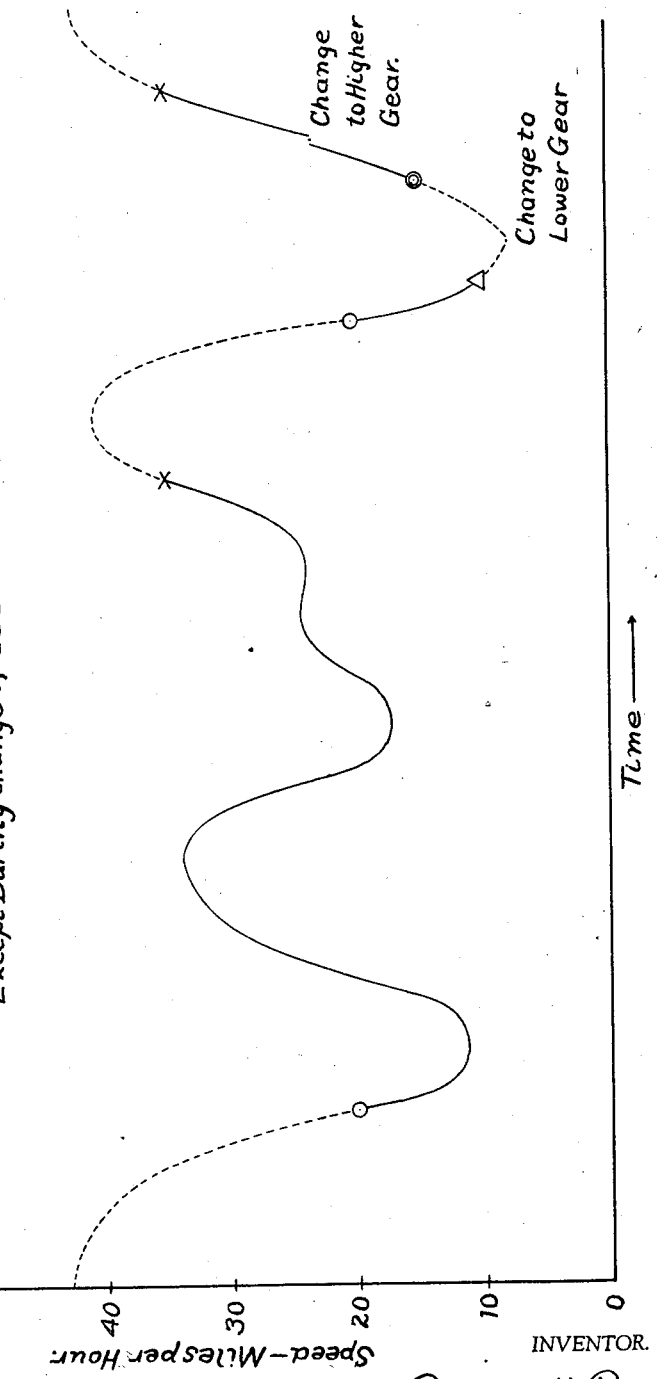

Patented Apr. 29, 1947

2,419,810

UNITED STATES PATENT OFFICE 2,419,810

MOTOR VEHICLE CONTROL APPARATUS

Frank H. Beall, Maplewood, N. J.

Application July 29, 1939, Serial No. 287,424

21 Claims. (Cl. 180—54)

This invention relates to an automatic control for starting and stopping an auxiliary engine arranged to deliver power to the propelling means of a motor vehicle and supplement the power of the main engine.

Safety and economy make it desirable that any automotive vehicle, particularly trucks and busses, shall be provided with sufficient motive power to enable a certain average safe speed to be maintained at all times whether when running up hills or on the level. It is not economical to accomplish this result by the use of a single primary engine of large size and it is more economical to employ an auxiliary engine to supplement the power of the primary engine whenever the additional power is needed.

Heretofore, the use of such an auxiliary engine combined with a main engine has been described in U. S. Patent to C. R. Short, No. 1,768,530, but the present invention represents a distinct and important improvement thereover with respect to starting, stopping and control of the auxiliary engine and its combination with the main engine. Accordingly, I propose to employ an auxiliary engine which may be automatically started from rest and automatically brought into use as required, and automatically stopped when not needed. This will ensure the greatest economy of fuel since the auxiliary engine will be run and used only a part of the time. The additional power then is supplied only when and as needed. When not needed, the auxiliary engine is at rest and thus consumes no fuel.

It is an object of this invention to provide conventional control for the primary engine and an automatic control for the auxiliary engine so that the auxiliary engine will be automatically started and connected to the driving shaft of the vehicle when, despite full throttle, the speed of the vehicle falls below a predetermined minimum due to the primary engine not delivering sufficient power, and automatically disconnected from the driving shaft and automatically stopped when the vehicle attains a predetermined high speed.

Another object of my invention is to so arrange the automatic control for the auxiliary engine that, when once started and connected to the driving shaft of the vehicle, it will continue to run and supply supplementary power, although the speed of the vehicle exceeds the predetermined speed at which the auxiliary engine was started and connected, and although the power of the primary engine falls below the predetermined point at which the auxiliary engine was started and connected.

It is a further object of my invention to assure a certain range of operation for the auxiliary engine automatically, so that it will not be constantly started and stopped with slight changes in the speed of the vehicle or in the power of the primary engine. Also, this invention provides means whereby the auxiliary engine is prevented from functioning at low speeds of the vehicle or main engine, or when the main engine is at rest.

By this invention, once the conditions are established so as to require the starting and connecting of the auxiliary engine, said operations will be performed and thereafter the auxiliary engine will continue to run and deliver power to the driving shaft until substantially different conditions of vehicle speed and different conditions of primary engine power come into existence and cause the auxiliary engine to be stopped and disconnected automatically.

Other objects and advantages will appear in the course of the following description taken in connection with the accompanying drawings and appended claims.

In the drawings:

Figure 4 is a sectional view of the starting and one way clutch element 92 of the automatic control system shown diagrammatically in Figure 2;

Figure 5 is a diagrammatic showing of the control element 76 which is responsive to the changes in the pressure in the intake manifold of the primary engine;

Figure 6 is a diagrammatic showing of a modified form of control element 76 which is responsive to the movement of the throttle of the primary engine;

Figure 7 is a diagrammatic showing of the control element 77 which is responsive to the speed of the vehicle or of the engine or other part of the vehicle driving train, whichever may be selected;

Figure 8 is a diagrammatic showing of the automatic control element 78 which is also responsive to the speed of the vehicle or of the engine or other driving part of the vehicle driving train;

Fig. 9 is a diagrammatic showing of control 77' of Fig. 3.

Fig. 10 is a diagram illustrating a typical mode of operation.

Figure 1:
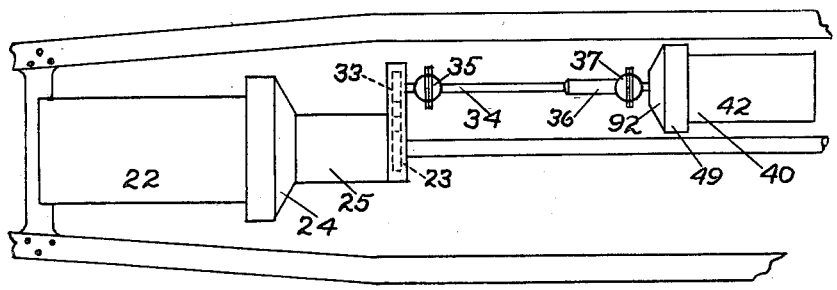
Figure 1 is a plan view of a portion of an automotive vehicle chassis provided with a main or primary engine and an auxiliary engine.

Referring to Fig. 1, the primary engine 22 is shown in a conventional way with the flywheel housing secured to a suitable clutch housing 24 enclosing a conventional type of clutching mechanism which is adapted to be controlled in a conventional manner. Secured to the clutch housing 24 is the transmission case 25 containing any type of suitable transmission.

Extending rearwardly from the transmission case 25 is the driven shaft which is connected to the conventional propeller shaft of the ordinary motor driven vehicle by a suitable universal joint.

Mounted upon the driven shaft is a gear 23 which is drivingly connected through intermediate idler gears for spacing, with a gear 33, which latter gear 33 may be connected through a universal joint 35 to a torque transmitting shaft, indicated generally at 34, which may have at its rearward end a splined portion 36 connected through a second universal joint 37 to the clutch shaft of a clutch 92.

The sliding joint afforded by the splines 36 at the rear end of the shaft 34, may serve to accommodate for variations in the relative positions of the primary engine and transmission assembly on the one hand, and the auxiliary or booster engine and booster engine clutch assembly on the other hand, indicated generally at 40.

This booster engine assembly includes an engine 42 which may be of any standard type of internal combustion engine, or a Diesel type engine.

The output end of the crank shaft of the booster engine 42 extends into the flywheel housing 49 and is connected to the clutch 92 so that the engine 42 may be clutched to the shaft 34 to drive the same.

Figure 2:
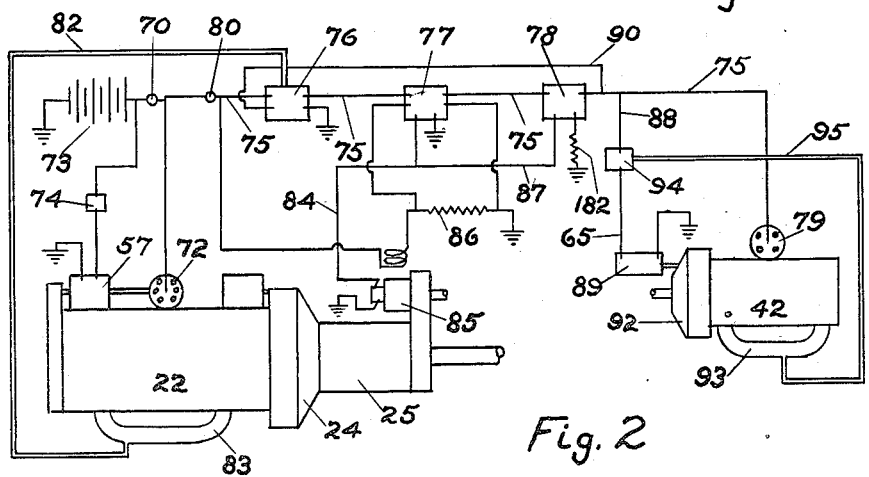
Figure 2 is a diagrammatic showing of one form of automatic control for the auxiliary engine in relation to the vehicle and to the primary engine.

The automatic control system shown in Figure 2 includes the primary engine 22, an electric generator 57, a battery 73, an ignition system indicated diagrammatically at 72, a primary engine clutch 24, and a transmission 25.

The battery 73 is shown as connected to the main ignition switch 70 and also as cross connected to the generator 57 of the primary engine 22 through the generator cut out relay 74. From the ignition switch 70, one electric conductor leads to the ignition system shown diagrammatically at 72. Another conductor 75 leads to the booster engine ignition system indicated diagrammatically at 79 through the manually operable switch 80 and the automatic relay switches 76, 77 and 78.

The manually operable switch 80 is provided to permit the electric circuit to the booster engine to be interrupted at will and thereby prevent its operation whenever desired.

The relay 77, shown more fully in Figure 7, is connected by a supplementary conductor 84 to a generator 85 which is arranged to be responsive to the speed of the vehicle, for which purpose it may be connected to be driven at any one of several places in the driving train. One driving connection for the generator 85 is shown as a connection to one of the gears in the driving train between the torque shaft 34 and the driven shaft of the transmission. Since the speed of this generator is arranged to be responsive to the speed of the vehicle, the voltage at its terminals will be responsive to the speed of the vehicle. When the voltage is above a predetermined point, corresponding to a high predetermined vehicle speed, such, for example as 35 miles per hour, the switch in the relay 77 is held open so that the circuit in the conductor 75 is interrupted. But when the voltage has dropped below a second predetermined point, corresponding to a second predetermined vehicle speed, such for example as 20 miles per hour, the switch in the relay 77 will be operated to close the circuit in the conductor 75. When once closed this switch is arranged to remain closed until the higher predetermined vehicle speed, such as 35 miles per hour, has been attained.

The relay switch 78, shown more fully in Figure 8, is shown as connected to the generator 85 by the conductors 87 and 84. Its design and adjustments are such that it will keep the circuit in the line 75 closed whenever the voltage of the generator 85 is above a predetermined low point corresponding to a predetermined low vehicle speed, such as, for example, 10 miles per hour. At the predetermined low vehicle speed, the switch in the relay will be permitted to operate to open the circuit in the line 75. But when once the switch has been operated to open the circuit in the line 75, it is so designed and adjusted that it cannot be operated to close the circuit again until some higher predetermined vehicle speed has been reached, such as, for example, 15 miles per hour.

The vacuum relay switch 76, shown more fully in Figure 5, is arranged to be responsive to the vacuum in the intake manifold 83 of the primary engine 22, with which it is connected by a conduit 82, and thereby is responsive to the varying positions of the throttle valve of the primary engine 22. It is so arranged that when the vacuum is low, which would be the case when the throttle valve is widely open, although not necessarily fully wide open, the switch in the relay 76 is operated to close the circuit in the conductor 75. This switch is so designed and so adjusted and so connected in the circuit of the line 75 that when once closed, it will remain closed if the switches in the relays 77 and 78 also remain closed, until a substantially higher degree of vacuum has been attained. The circuit from the main ignition switch 70 to the booster engine ignition system 79 cannot be completed until the hand switch 80 and all these automatic switches have been closed by the coming into existence of the conditions which cause these switches to be closed.

Simultaneous with the completion of the circuit to the booster engine ignition system 79, a second circuit will be completed through the line 88, relay 94 and line 65 to the clutch magnet 89 which will operate the starting clutch indicated at 92, and shown in detail in Figure 4, to cause the booster engine to be cranked by the main engine and thereby started. When the booster engine has been started it will deliver its power to the vehicle through the one way clutch, also indicated at 92 and shown in more detail in Figure 4. As soon as the booster engine has been started, its intake manifold 93 creates a suction which is communicated to the switch 94 through the pipe 95 to open the circuit from the line 75 to the starting clutch magnet 89. After the booster engine has been once started, it will continue to run until some substantial change in conditions occurs to cause some one or more of the three automatic control switches to be operated to interrupt the circuit to the ignition system of the booster engine, thereby stopping it. Being connected to the vehicle by a one way clutch, the booster engine is disconnected from the driving train of the vehicle as soon as its speed falls below the speed of the torque shaft 34.

Figure 7 shows the details of the relay switch 77 and the wiring of the generator 85. For convenience of explanation the generator 85 is shown as separately excited by current from the battery through the conductor 158. A shunt wound generator would serve equally well. In the excitation shown, the return circuit from the field coil 157 is to the ground either through conductor 159 and the resistance 86 or as shown, through conductors 159, 164 and 160, the contact points 163 and 161 being bridged by the bar 162 on the underside of the armature from which it is suitably insulated. When the connection between the points 163 and 161 is broken, the circuit is completed through the resistance 86 which will reduce the current in the field coil 157 and thereby reduce the voltage of the generator and of its outside circuit through the conductor 84 and the coil 150 to the ground.

The circuit in the line 75 is shown interrupted by the separation of the two contact points 153 and 154. This may be the condition when the vehicle speed is above the predetermined point, for example, 20 miles per hour. If, with the switch in this position, the vehicle speed should be increased the generator voltage will also increase and continue to hold the armature 155 down in the position shown. If the vehicle speed should be lowered below the predetermined point, for example, 20 miles per hour, the coil 150 is so designed that it will no longer be able to hold the armature 155 down against the tension of the spring 156 shown at the left end of the armature 155, and the circuit in the line 75 will be completed through the contact points 153 and 154. This will interrupt the circuit from the field coil 157 through the conductors 159, 164 and 160 by lifting the bridge 162 from the contact points 161 and 163. This will cause the circuit of the field coil to be completed through the resistance 86, thereby reducing the voltage of the generator 85 at any given speed. The generator will have to be run at a predetermined higher speed corresponding to a predetermined higher vehicle speed, such as 35 miles per hour to create the predetermined voltage required to cause the coil to draw the armature down and restore the conditions illustrated in this Figure 7.

Figure 8 shows the details of the relay switch 78 and its wiring arrangements. The circuit in the line 75 is shown as completed through the contact points 183 and 184. This may be the condition when the vehicle speed is above some predetermined point, such as 10 miles per hour. If, with the switch in this position, the vehicle speed should be increased, the generator voltage will also be increased and will continue to hold the armature 185 down in the position shown. If the vehicle speed should be lowered below the predetermined point, for example, 10 miles per hour, the coil 180 is so designed that it will no longer be able to hold the armature 185 down against the tension of the spring 176 shown at the left end of the armature 185, and the circuit in the line 75 will be interrupted. This will also interrupt the circuit through the contact points 171 and 173 by the lifting of the bridge 172, thereby throwing the coil circuit through the resistance 196. This will bring it about that the generator 85 will have to run at a predetermined substantially higher speed corresponding to a predetermined higher vehicle speed, which may be any speed higher than 10 miles per hour; for example, 15 miles per hour, to create the predetermined voltage required to cause the coil to draw the armature down and restore the conditions shown in Figure 8.

The relay switch 78 with its wiring circuits shown in Figure 8, may be modified to take the place of the relay switch 77, with its wiring circuits shown in Figure 7, by mounting the contact 184 on the upper side of the armature 185, and the contact point 183 at a suitable place and distance above the armature, such that the contact point 184 will touch contact point 183 when the armature is in the raised position. These changes serve to put these contact points 183 and 184 in positions similar to the positions occupied by the contact points 153 and 154 shown in Figure 7. With these changes, the resistance of the field circuit of the generator 85, whether shunt excited or separately excited, will remain unchanged by the different positions of the relay armature.

Figure 5 shows the details of the vacuum relay switch 76 and its wiring arrangements. The circuit in the line 75 is shown as interrupted by the separation of the two contact points 193 and 194. This may be the condition when the vacuum in the intake manifold of the primary engine is high, corresponding to various positions of the throttle valve other than the fully opened or the nearly fully opened positions of the valve. If with the armature in this position shown, the throttle opening should be decreased, the vacuum in the intake manifold will be increased, and the armature 195 will continue to remain in the raised position by which the circuit in the line 75 is interrupted.

If with the armature in the position shown, the throttle opening should be increased, the vacuum in the intake manifold will be decreased. If the decrease reaches some predetermined degree of vacuum, corresponding to positions of full open or nearly full open throttle valve, the vacuum will be overcome by the spring 196 causing the piston 200 and the armature 195 to fall and complete the circuit in the line 75, through the contacts 193 and 194. This will also complete the circuit from the line 75 through the line 90 and the coil 190, and through the adjustment resistance 192, to the ground. Thus, if all the several switches in the line 75 are closed, the coil 190 will be energized to hold the armature down until the circuit through the coil is broken by the opening of one of the switches in the relays 77 or 78, located in the circuit in the line 75. This coil 190 may be designed and adjusted to have any strength desired to oppose the force of the vacuum upon the piston 200. For example its strength may be such as to hold the armature down until the degree of vacuum in the intake system corresponds to a half closed or more than half closed position of the throttle valve.

Figure 6 shows an arrangement of relay switch suitable to be used in the place of the vacuum relay switch 76 in case it be desired to have a switch responsive directly to different positions of the throttle valve or of the accelerator pedal. Such an arrangement would be suitable either for a Diesel engine or for a conventional internal combustion engine.

Referring to Figure 6, the circuit in the line 75 is shown as interrupted by the separation of the two contact points 213 and 214. This may be the condition when the throttle valve or accelerator pedal is in an intermediate position between fully closed and fully open positions. If with the armature in the position shown, the throttle opening should be decreased by the movement of the accelerator 220, the armature will continue to remain in the raised position, and the circuit in the line 75 will remain interrupted. If with the armature in the position shown, the throttle opening should be increased to the point at which the contact 217 reaches the contact 218, corresponding to a fully wide open or nearly wide open throttle position, it closes the circuit from the line 75 through conductor 90', the resistance 212, the coil 210, the line 219, and the contacts 218 and 217 to the ground. The closing of this circuit causes the coil to be energized and to draw down the armature, closing the circuit in the line 75 at the contact points 213 and 214. This will also complete the circuit from the conductor 219 through contacts 223, 222 and 221 to the ground. The completion of this last circuit enables the coil to be energized although the circuit through the contacts 217 and 218 is interrupted. This causes the armature to remain in the down position, even though the throttle valve is moved toward a more closed position. If the throttle valve should be moved to the point at which the circuit is closed through the contacts 216 and 217, corresponding to closed or nearly closed throttle position, the armature will rise under the action of the spring 224 following the demagnetization of the coil through its being short circuited, and interrupt the circuit in line 75. Thus if all the several switches in the circuit through line 75 are closed, the coil will be energized by the closing of contacts 217 and 218 to hold the armature down until the circuit is broken through the coil by the opening of some one or more of the other switches in this circuit through the line 75, or until the circuit is broken as just described above.

Since the throttle shown in Fig. 6 controls the induction system of the main engine, including the vacuum in the intake manifold 83 the controls either by Fig. 5 or Fig. 6 produce substantially the same result, and for the purpose of this application the throttle is a part of the main engine induction system.

The starting and one way clutch indicated at 92 in Figure 2, and shown in detail in Figure 4 is adapted to effect clutching engagement between the engine crankshaft 96 of the booster engine 42 and the splined end 97 of the clutch shaft 98. When all the switches in the line 75 are closed, the starting clutch magnet 89 will be energized and will draw the rod 106 to the left moving the starting clutch 99 to the right against the spring 102 by means of the lever 104 pivoted at 105. The clutch magnet 89 and the spring 102 should be so proportioned that the contact between the clutch faces 100 and 108 though sufficiently firm to crank the booster, will allow a slipping action until the booster is up to speed.

As the booster engine gains speed the one way clutch 107 is screwed forward on steeply pitched threads 113 on the shaft 96 by its inertia aided by the centrifugal members 110 as they move outwardly. The centrifugal force of these members 110 causes a camming action of the inner ends 112 of these arms on the shoulder of a groove around the shaft 96 which forces the one way clutch member 107 forward. However, as long as the booster engine speed is below that of the clutch shaft 98 the friction between the clutch faces 100 and 108 will oppose the forward motion of the one way clutch member 107 on the threads 113. But as soon as the speed of the booster engine attempts to exceed that of the clutch shaft 98 this friction will assist the rotation of the one way clutch member 107 in the forward direction to force the yieldably held cranking clutch member 99 back against the shoulder on the clutch shaft 98, and firmly wedge the two clutch members together in driving relation for imparting driving torque to the shaft 34.

As described above, after the booster engine has been started the vacuum of the intake manifold 93 operates the switch 94 to open the circuit 88 from the line 75 to the starting clutch magnet 89. Since it is desirable to maintain the starting friction between the clutch faces 100 and 108 until the booster has come up to speed and until the clutch members are in driving relation, the action of the switch 94 should be delayed, as by a dashpot, until the booster has had time to come up to speed. Further, if the current consumption of the clutch magnet 89 is not objectionable, the relay 94 can be omitted and the current can be allowed to run through the magnet as long as the booster is operating.

As soon as any one of the control relays operates to open the circuit in the line 75, the booster ignition will be cut and the booster engine would have to be driven by the clutch 92 if it continued to run. This driving friction of the face 100 would tend to unscrew the driving clutch member 107 against the force of the centrifugal members 110 tending to keep the clutch engagement as long as the booster is running. To insure that the booster is not continued to be driven by the main engine after its ignition is cut, these centrifugal members are proportioned so that the clutching force resulting from the centrifugal action of these members is not sufficient to drive the booster, thereby allowing it to slow down and stop.

Figure 3:
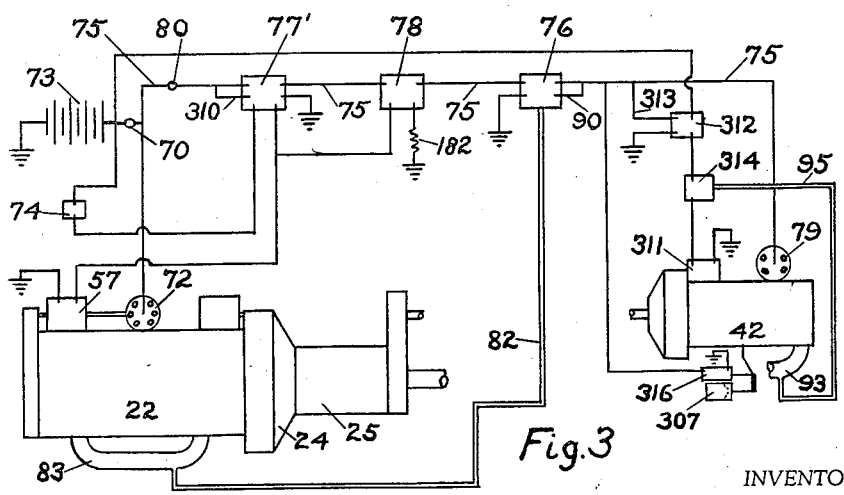
Figure 3 is a diagrammatic showing of a modified form of automatic control system for the auxiliary engine.

Figure 3 shows a modified form of the control system shown in Figure 2.

In Figure 3 the relays 76 and 78 are the relays 76 and 78 shown in Figure 2. Relay 77' is designed to be operated by variations in the current output of the main generator 57, and for this purpose is connected in the circuit between the generator 57 and the cut out relay 74. This relay 77', shown in Fig. 9, is so designed that when a predetermined engine speed is reached such as may correspond to a car speed of 25 miles per hour when the car is in direct drive gear connection the battery charging current will be sufficient to create sufficient magnetism in the main relay coil 300 to pull the armature down and open the circuit in line 75 through contacts 301. At the same time contacts 303 are closed and complete a circuit from line 75, conductor 310, auxiliary coil 302 and contacts 303 to ground. The magnetism created by this auxiliary coil is added to the magnetism created by the main coil of the relay whereby less battery charging current will be required to hold the armature down than was required to pull it down originally.

The design of this auxiliary coil can be so arranged that the magnetism created by this coil and the main coil together will hold the armature down until some predetermined engine speed has been reached. At this lower engine speed such as, for example, 20 miles per hour when the car is in direct drive gear connection the battery charging current from the generator will be insufficient to create the magnetism required to hold the armature down against its spring. When the armature rises it closes the circuit in the line 75 and opens the circuit through the auxiliary coil in the relay.

In this way the cost and care of the extra generator 85 shown in Figure 2 are saved. It will be appreciated, however, that the range of operation of this control system of Figure 3 will be a little more limited than the control system shown in Figure 2 due to the effect of the cut out relay 74 in preventing the battery charging current from rising above predetermined values at higher engine speeds.

This system is also limited in respect to the maximum voltage that can be applied to the relay 78. The cut-out relay 74 is arranged to connect the generator 57 to the battery 73 for charging at a predetermined voltage, corresponding to certain generator speeds which correspond to certain engine and car speeds, when in direct drive.

The result of this connection of the generator to the battery is that the generator voltage is prevented from exceeding the battery voltage by an appreciated amount. This means that the relay 78 must be arranged to be operated by a voltage that is below this predetermined maximum, and hence, by a voltage corresponding to certain moderate generator speeds which in turn correspond to moderate engine and car speeds when driven in direct drive.

When the control of the relays 77' and 78 is according to engine speeds it will be according to engine speeds irrespective of whether the car is being driven in first, second, third, fourth, or reverse gears.

When the control of these relays is according to the speed of the driven shaft or to the speed of some other rotating part in the driving train to the rear of the transmission, it will be according to car speeds irrespective of whether the gear connection in the transmission is set for first, second, third, fourth or reverse speeds.

In such cases the coils of the relay 78 may be so designed that the relay will always operate to open the circuit in the line 75 when the car speed drops below some predetermined speed such as for example 10 miles per hour.

This predetermined speed should be some speed that will be above the maximum speeds that would be normally attained by the car when driven in first or in reverse gears.

Thus this arrangement serves to prevent the booster engine from operating wheneveer the car is being driven in first or in reverse gears, thereby guarding against undesirable overload upon the driving train to the rear of the transmission.

But when the relay 78 is connected to be controlled according to engine speeds, some arrangement may be desired to protect the driving train to the rear of the transmissions from such overloads when the transmission is in first gear or in reverse.

This protection may be easily arranged in any one of several ways. One simple way is to provide a mechanical switch in the connection of the relay 78 to the ground, so arranged that when the switch is operated it will open the circuit from the relay to the ground and thereby prevent the relay 78 from being energized to close the circuit in the line 75.

This switch may be arranged to be operated by the shifter rod or by other parts moving therewith when the first speed or the reverse speed gear connections in the transmission are made.

Referring again to Figure 3 the booster engine is shown as arranged to be started by a conventional electric starter 311, which is connected directly to the battery through the relay 312, the switch of which is normally held open. When all three control relays 76, 77' and 78 are closed to complete the circuit in the line 75 the relay 312 will be energized by the voltage supplied through conductor 313, causing the circuit to be closed from the battery to the booster engine starter.

As soon as the booster engine has been started thte vacuum in the intake manifold 93 will open the switch 314 and cause it to open the circuit from the battery to the booster starting motor.

The driving connection between the booster engine and the shaft 34 is arranged to be effected by means of a one way clutch, such as an ordinary one way dog clutch or the one way clutch shown in Figure 4, but without the mating face 99 being movable on its shaft 98.

The action of this clutch upon engagement when the booster engine is first started up is prevented from being too abrupt by arranging means to delay the full opening of the throttle valve of the booster engine until the clutch has become fully engaged to the shaft 34. These means may consist of a solenoid 316 operating the throttle valve to open against the dash pot 307.

Figure 10 diagrammatically illustrates a typical operation of the vehicle of this invention, whichever one of the specific forms of the apparatus may be employed, and with the apparatus constructed and adjusted for the predetermined speeds as hereinbefore mentioned. The diagram plots speed of the vehicle against time and assumes at the outset that a loaded truck is in operation on a smooth and level road at a speed in excess of 35 miles an hour at which speed and condition the main engine is adequate to drive the truck without any help from the booster engine which is at rest. However, as the truck encounters a hill the throttle is pressed to a substantially wide open position (thus closing the vacuum switch 76) but, nevertheless, the switch 77 remains open until the speed of the vehicle drops to 20 miles an hour whereupon the switch 77 closes and starts the booster from rest and clutches it to the propelling means. The hill being very steep, the truck, despite the joint action of the main and booster engines, still loses speed until it is at a speed but slightly above 10 miles an hour, where, upon striking a level stretch, promptly, with both the booster and main engines pulling, increases its speed quite rapidly to a speed slightly less than 35 miles an hour whereupon it encounters a very steep hill which despite main and booster engines both pulling gradually drops the speed of the truck to somewhat less than 20 miles an hour. Following a succession of grade changes the truck comes to a level spot whereupon its speed increases to above 35 miles an hour and the switch 77 opens and the booster stops. After a short run on the level at a speed in excess of 35 miles an hour the truck encounters another steep hill which drops its speed down to 20 miles an hour, whereupon the switch 77 again closes, starting and cutting in the booster, but the hill is so steep that the combined booster and main engines are still unable to maintain the speed and the speed drops to below 10 miles an hour at which the switch 78 opens and cuts out the booster. Then the operator changes to a lower gear which enables the truck to speed up once more and at 15 miles an hour the switch 78 closes and cuts in the booster once more. Due to greater torque with or without a reduction in the steepness of the hill, the speed of the truck increases and the operator then changes back to high upon encountering a diminution of the grade. Momentarily, however, as the change is made, due to a closed throttle during shifting, the switch 76 opens and cuts out the booster, but, upon the throttle being fully opened after the change, the switch 76 closes and cuts in the booster again, whereupon the truck continues to run with both the main engine and the booster pulling until its speed exceeds 35 miles an hour when the switch 77 opens and cuts out the booster bringing the conditions back to those at which the diagram and the assumed operation started.

As above stated, Fig. 10 represents conditions in which the vacuum or throttle controlled switch 76, remains closed except momentarly during the shifting of the gears. Switch 76, however, in its preferred form as described and shown herein, is so constructed and adjusted that it closes when the intake manifold vacuum reaches a predetermined low value or the throttle is substantially open. It does not open when that value is exceeded but remains closed until a definitely higher value is reached, thus providing a delayed action so that the usual minor manipulations of the throttle by the operator will not open and close this switch with consequent unnecessary stopping and starting of the booster. Also, when the booster comes into operation it rapidly adds a large increment of power so that it is desirable and necessary to have control of the power output of the main engine (with the booster still operating) and this the operator can do by simply letting up as desired on the foot accelerator of the main engine. For best results, the booster should be connected so that its maximum power is supplied at about the predetermined point of high speed cut-out.

Having described my invention, I claim:

1. In an automotive vehicle including a plurality of engines and propelling means, means for independently connecting said engines to said propelling means, control means for independently controlling the power output of one of said engines during normal operation thereof, automatic means controlled by movement of said control means towards full power position and to a predetermined point in the range of movement of said control means to start a second engine from rest and connect it to the propelling means, means in said automatic means arranged to prevent disconnection of said second engine during said second engine operation and during subsequent opposite movement of said control means towards low power position from said predetermined point and during a range of movement of said control means from said predetermined point to a second predetermined point when said control means is moved to substantially no power position, and means in said automatic means to stop said second engine at said second predetermined point and disconnect it from said propelling means.

2. In an automotive vehicle including a plurality of engines and a propelling means, means for independently controlling the power output of one of said engines during normal operation thereof, including an electric generator and means, including a switch operated by an increase in speed of said generator to a predetermined point for connecting at said predetermined point a second of said engines to said propelling means, including magnetic means arranged to prevent said switch from operating and disconnecting said second engine by subsequent decrease of speed below said predetermined point.

3. In an automotive vehicle including a plurality of engines and a propelling means, means for independently controlling the power output of one of said engines during normal operation thereof including a throttle and means operated by moving said throttle towards closed position and to a predetermined point during operation of a second engine for stopping and disconnecting at said predetermined point said second engine from the propelling means and arranged to be prevented from starting and connecting said second engine by subsequently moving said throttle towards open position from said predetermined point.

4. In an automotive vehicle including a plurality of engines and a propelling means, means for independently controlling the power output of one of said engines during normal operation thereof, an electric generator and means, including a switch operated by an increase in speed of said generator to a predetermined point for disconnecting at said predetermined point a second of said engines from said propelling means, including magnetic means arranged to prevent said switch from operating and connecting said second engine by subsequent decrease in speed below said predetermined point.

5. In combination, a vehicle chassis having a main engine and propelling means, a secondary booster engine normally at rest, means for starting said booster engine from rest, a clutch for coupling said booster engine to said propelling means, and interlocking means responsive to speed of a main-engine-driven generator and also to some part of the induction system of said main engine for automatically actuating said starting means to start the booster engine from rest and clutching said booster engine to said propelling means whereby said booster engine assists said main engine in driving the vehicle, said interlocking means including an electric relay responsive to the speed of said generator.

6. In combination in a vehicle, a main engine power unit, a propelling means, a supplemental engine power unit normally at rest, means for connecting said supplemental power unit to said propelling means, a starting means for said supplemental unit for starting it from rest, said last two means comprising a one-way clutch, means to operate said clutch to start said supplemental unit and means to render said last means inoperative once the booster has started, so that further functioning of said clutch is solely that of a one-way clutch.

7. In combination in a vehicle, a manually controlled main power unit, a battery, a propelling means, a supplemental power unit, means for connecting said supplemental unit to said propelling means, an electric starting means for said supplemental unit, a circuit from the battery to said starting means, a circuit from the battery to the ignition system of said supplemental unit, relay switches to control the energizing of said circuits to actuate said starting means to start the supplemental unit and connect it to the propelling means including a relay switch set to operate at a predetermined low speed, a second relay switch to operate at a predetermined higher speed, and a third switch to operate by a predetermined throttle position of the main power unit, a generator driven by an engine-driven element electrically connected to said relays to operate said relay switches according to the speed of said generator.

8. The combination of claim 7 further characterized by at least one of said switches including means to cause it to open under different generator speed or main power unit throttle position from those at which it is set to close.

9. In combination, a main power unit, a supplemental power unit, a transmission common to said units, a clutch between said supplemental power unit and said transmission, means for actuating said clutch, a throttle-responsive control on said main power unit for said clutch actuating means, a minimum speed-responsive control on said main power unit for conditioning said throttle-responsive control for operation, and secondary speed-responsive means interlocked with said throttle-responsive control for starting said supplemental power unit and clutching the same to said transmission under predetermined throttle and speed conditions at said main power plant.

10. In combination in a vehicle, a main power unit, a battery, a propelling means, a supplemental power unit, means for connecting said supplemental power unit to said propelling means, a circuit from said battery to the ignition system of the supplemental unit and automatic means responsive to the manifold vacuum of said main power unit during supplemental unit operation for opening said ignition circuit, stopping said supplemental unit and thereby causing it to be disconnected from said propelling means.

11. In combination, a vehicle chassis having a main engine, an accelerator therefor and an accelerator operated switch and propelling means, a secondary booster engine, a clutch for coupling it to the propelling means, a throttle, an ignition circuit, a starting circuit and starting means therefor, an automatic control means responsive to combined speed and the movement of said accelerator toward full power position and the operation of said accelerator operated switch for simultaneously energizing said ignition and starting circuits to start the booster engine, open said throttle and operate said clutch into driving engagement, so that the booster engine assists the main engine in driving the vehicle.

12. In a vehicle having an engine, a manual control therefor, a battery, an intake manifold and a switch operating mechanism and control means therefor, said mechanism comprising a cylinder, a piston therein, a spring biasing said piston toward one end of the cylinder, a connection from said manifold to said cylinder to operate said piston by vacuum acting against the force of said spring and means, including an electric magnet, arranged to maintain said piston in a fixed position against the force of said spring during variations in said vacuum tending to cause said piston to move from said fixed position under the influence of said spring and said vacuum with changing positions of said manual control in the operation of said vehicle, a circuit from said battery to said magnet and means in said control means arranged to close and open said circuit according to the speed of an engine-driven element.

13. The combination of claim 12 further characterized wherein said means in said control means is arranged to close said circuit at one predetermined speed and open it at a second predetermined speed.

14. In a vehicle having an internal combustion engine, a manual control means therefor, a battery, driving and driven members and clutching means for connecting said members for one-way drive, a second clutching means and means for actuating said second clutching means either into or out of engagement including a spring and a solenoid, a circuit from said battery to said solenoid and automatic means to control the energization and deenergization of said circuit, said automatic means including a first control responsive to the movements of said manual control to and away from full power position to energize and deenergize said circuit, a second control responsive to the speed of said engine to condition said first control for operation only below a predetermined engine speed whereby said first control can only cause clutch actuation of said second clutching means either into or out of engagement only below said predetermined speed and said means for connecting said members for one-way drive containing means to cause it to come into positive clutching engagement to connect said members only when said driving member attains a condition of synchronous speed with said driven member.

15. The combination of claim 14 further characterized wherein said means for connecting said members for one-way drive comprises a clutch face mounted on a screw thread on said driving member and said second clutching means comprises a mating clutch face mounted on splines on said driven member and including the provision of means in said second control whereby, when it has once operated to prevent said first control from causing clutch actuation, it cannot again operate to permit said first control to cause clutch actuation either into or out of engagement until a second and somewhat higher speed is reached.

16. In combination, a vehicle, an internal combustion engine having a manual control means therefor, a battery, an engine-driven generator, a battery charging circuit connected from said generator to said battery, including a cut-out for opening said charging circuit below a given engine speed, a clutch and means for operating said clutch into and out of engagement including a solenoid, a circuit from said battery to said solenoid and automatic means for controlling the energization of said second circuit, said automatic means including a first control operated by moving said manual control towards full power position to energize said second mentioned circuit, a second control responsive to the speed of said engine to prevent the energization of said second circuit above a predetermined maximum engine speed and a third control to prevent energization of said second circuit below a predetermined minimum engine speed, said last control comprising a normally open relay switch having a magnetic coil, a circuit from said generator to said coil to close said switch and to allow it to open at said predetermined minimum speed, said last circuit being so arranged that the operation of said relay switch is independent of the operation of said cut-out in said battery charging circuit.

17. In combination, a vehicle, an internal combustion engine having a manual control means therefor, a battery and a generator driven by an engine-driven element, a clutch and means for operating said clutch into and out of engagement including a spring and a solenoid, a circuit from said battery to said solenoid and automatic means for controlling the energization of said circuit including a first control operated by moving said manual control toward full power position to energize said circuit, a second control responsive to the speed of said generator to prevent energization of said circuit above a predetermined maximum generator speed and a third control to prevent the energization of said circuit below a predetermined minimum generator speed, said last two controls being relays, the first having a normally closed switch which is opened by a magnet connected to said generator when the speed of said generator reaches said maximum, and the second having a normally open switch which is closed by a magnet connected to said generator when the speed of said generator reaches said minimum.

18. In combination, a vehicle, an internal combustion engine, a manual control means therefor, a battery, a clutch and means for actuating said clutch into and out of engagement, said means including a spring and a solenoid, a circuit from said battery to said solenoid for its energization and automatic means for controlling the energization and deenergization of said circuit for controlling said actuating means, said automatic means including a first control operated on moving said manual control towards and away from full power position to cause clutch actuation, a second control to prevent clutch actuation by said first control above a predetermined maximum speed of an engine-driven element, and a relay switch in said circuit and means responsive to the speed of an engine-driven element to operate said relay at a predetermined minimum speed of an engine-driven element to prevent clutch actuation by said first control below said predetermined minimum whereby said first control can control the actuation of said clutch into and out of engagement only in a speed range of said maximum to said minimum.

19. The combination of claim 18 further characterized to contain means wherein when said speed responsive means has once operated said relay at said predetermined minimum speed to prevent clutch actuation by said first control, said speed responsive means cannot again actuate said relay to permit clutch actuation into and out of engagement by said first control until said speed responsive means reaches a predetermined speed higher than said predetermined minimum.

20. In combination, a vehicle, an internal combustion engine, a manual control means therefor, a battery, a clutch and means for actuating said clutch into and out of engagement, said means including a spring and a solenoid, a circuit from said battery to said solenoid for its energization and automatic means for controlling the energization and deenergization of said circuit for controlling said actuating means, said automatic means including a relay switch in said circuit and a first control means for operating said relay on moving said manual control towards and away from full power position to cause clutch actuation, a second control to prevent clutch actuation by said first control above a predetermined maximum speed of an engine-driven element and a third control to prevent clutch actuation below a predetermined minimum speed of an engine-driven element whereby said first control can control the actuation of said clutch into and out of engagement only in a speed range of said maximum and said minimum.

21. The combination of claim 20 further characterized to contain means, when said first control causes clutch actuation on moving said manual control towards full power position, to prevent opposite clutch actuation by said first control on moving said manual control away from full power position until said control has moved to substantially idling position.

FRANK H. BEALL.

REFERENCES CITED

The following references are of record in the file of this patent:

UNITED STATES PATENTS

| Number | Name | Date |
| --- | --- | --- |
| 1,768,530 | Short | June 24, 1930 |